W. H. DUVALL.
LOCK FOR PAILS.
APPLICATION FILED MAR. 9, 1915.
1,201,948.
Patented Oct. 17, 1916.
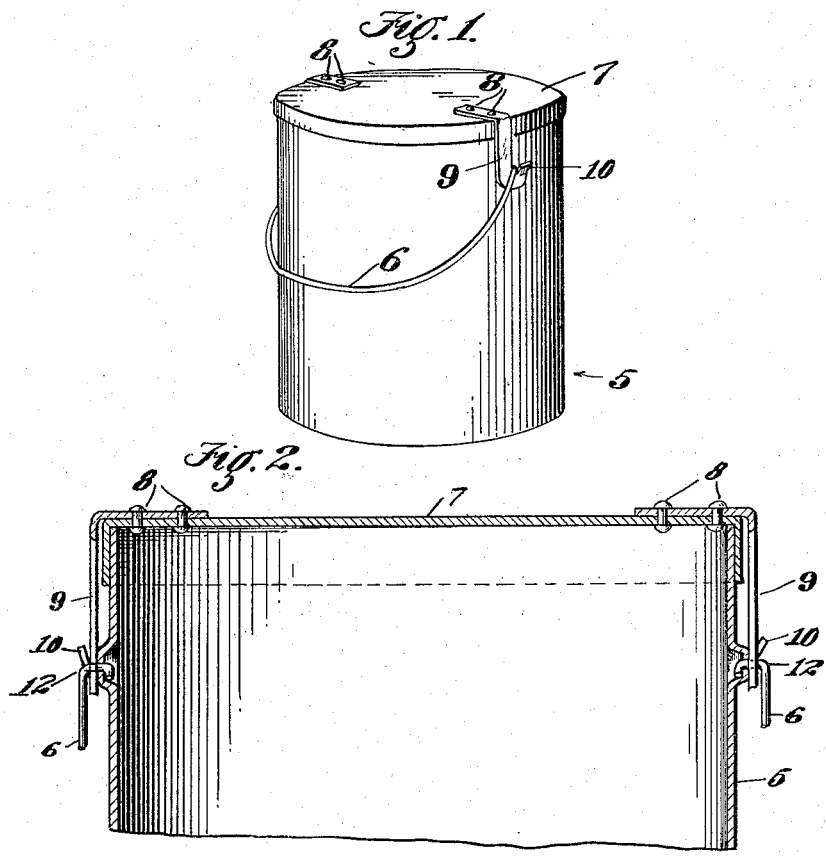
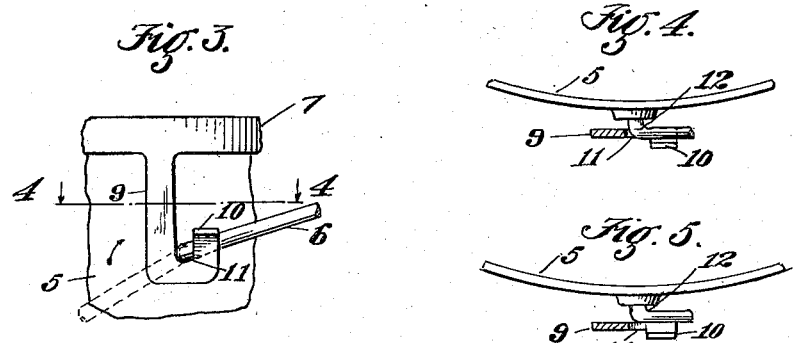
Witnesses:
James M. Abbett
Marguerite Bates
Inventor.
Willard H. Duvall.
By
Edmund A. Strause
Atty

UNITED STATES PATENT OFFICE.

WILLARD H. DUVALL, OF LOS ANGELES, CALIFORNIA, ASSIGNOR OF ONE-HALF TO AUGUSTUS NEISTRUM, OF BEVERLY HILLS, CALIFORNIA.

LOCK FOR PAILS.

1,201,948.　　　　Specification of Letters Patent.　　Patented Oct. 17, 1916.

Application filed March 9, 1915. Serial No. 13,113.

*To all whom it may concern:*

Be it known that I, WILLARD H. DUVALL, a citizen of the United States, residing at Los Angeles, in the county of Los Angeles and State of California, have invented new and useful Improvements in Locks for Pails, of which the following is a specification.

My invention relates to receptacles having covers and locking means therefor.

It is an object of my invention to provide a receptacle having a cover and a pivoted bail, with means which coöperates with the bail to securely lock the cover in place, and whereby the cover is readily and quickly locked and unlocked by passing the bail from one side of the receptacle to the other.

My invention is especially adapted for garbage cans and prevents the cover from being knocked off by cats, dogs and other animals, thus preventing the scattering of garbage and refuse, and providing a sanitary garbage receptacle.

The locking means can be applied to any receptacle having a pivoted bail and forms a compact simple structure requiring no added movable parts.

Referring to the accompanying drawing, a receptacle is illustrated provided with the preferred form of my lock.

Figure 1 is a perspective view of a bucket cover bail and means coöperating with the bail for locking the cover. Fig. 2 is a fragmentary vertical cross section taken through the locking means shown in Fig. 1. Fig. 3 is an enlarged view of a detail of the locking means. Fig. 4 shows a detail in section taken on the line 4—4 in Fig. 3. Fig. 5 is a view similar to Fig. 4 showing the bail in another position.

More specifically, 5 designates an ordinary cylindrical receptacle whch is provided with the usual bail 6 and cover 7. Secured to the cover preferably by means of rivets 8 at points diametrically opposite are downwardly extending catches or hooked lugs 9 which with the bail 6 form a simple and efficient means by which the cover is securely locked to the receptacle.

Each catch 9 depends from the cover 7, is preferably formed of resilient material to permit the catch to be moved to and from the receptacle, and normally stands out from the receptacle body. It has an upturned end 10 which is bent outwardly from the plane of the body of the arm. The slot 11 of the hook is positioned to engage the inturned trunnion part 12 of the bail so that when the bail is in the position shown by the dotted lines in Fig. 3, the hook is locked into engagement wth the trunnion of the bail.

Referring particularly to Figs. 3, 4 and 5 it is seen that the bail 6 as it is moved into its locking position presses the catch 9 inward from the position shown in Fig. 5 to that shown in Fig. 4 bringing the slot 11 under the trunnion 12 of the bail. Further movement to the position shown in dotted lines in Fig. 3 secures the shank of the hook behind bail and the cover is prevented from being removed from the receptacle by reason of the bail obstructing movement of the hook upward. To unlock the cover the bail is passed from the position shown in dotted lines in Fig. 3 to the other side of the receptacle. In its movement it rides against the outwardly bent end 10 of the hook, the end of the hook springing outward as shown in Fig. 5 its resiliency causing such movement as it springs to its outward position shown in Fig. 5 carries the slot 11 out of registration with the trunnion 12 and releases the hook from engagement with the bail, thus unlocking the cover.

My preferred construction as above described shows the depending catches 9 attached to the cover by means of rivets, but the attachment may be effected in any well known manner as by soldering or brazing the catch to the cover and if desired the catch may be made integral with the cover as shown in Fig. 3. This construction permits the attachment of the hooks to the cover of an ordinary receptacle.

In operation it is only necessary to place the cover on the receptacle, the point of the hook facing the side of the receptacle upon which the bail rests, having the hooks at the points where the bail is pivoted to the receptacle. The cover may now be locked in place by passing the bail to the opposite side of the receptacle and unlocked by a reverse movement.

What I claim is:—

1. A cover lock for receptacles, comprising a cover having depending hooked catches diametrically disposed thereon, and a receptacle provided with a pivoted bail, said bail arranged to engage the hooked catches of said cover to lock the cover to the receptacle when in one horizontal position and release said catches in the opposite horizontal position.

2. In combination with a receptacle body, a pivoted bail, a cover for said body, catches secured to the cover at diametrically opposite points and overhanging the sides thereof, said catches forming depending hooks with the slots thereof arranged for registration with the points of connection of the bail and the body, said hooks having their ends off-set from the body of the hook so that the bail when swung into one horizontal position catches said hooks and when swung into the opposite horizontal position releases said hooks therefrom.

In witness that I claim the foregoing I have hereunto subscribed my name this 22nd day of February, 1915.

WILLARD H. DUVALL.

Witnesses:
ERNEST L. WALLACE,
MARGUERITE BATES.

Copies of this patent may be obtained for five cents each, by addressing the "Commissioner of Patents, Washington, D. C."